March 23, 1971 C. F. CAFOLLA 3,572,194
AUTOMATIC INDEXING TOOL BLOCK
Filed Feb. 12, 1968 3 Sheets-Sheet 1
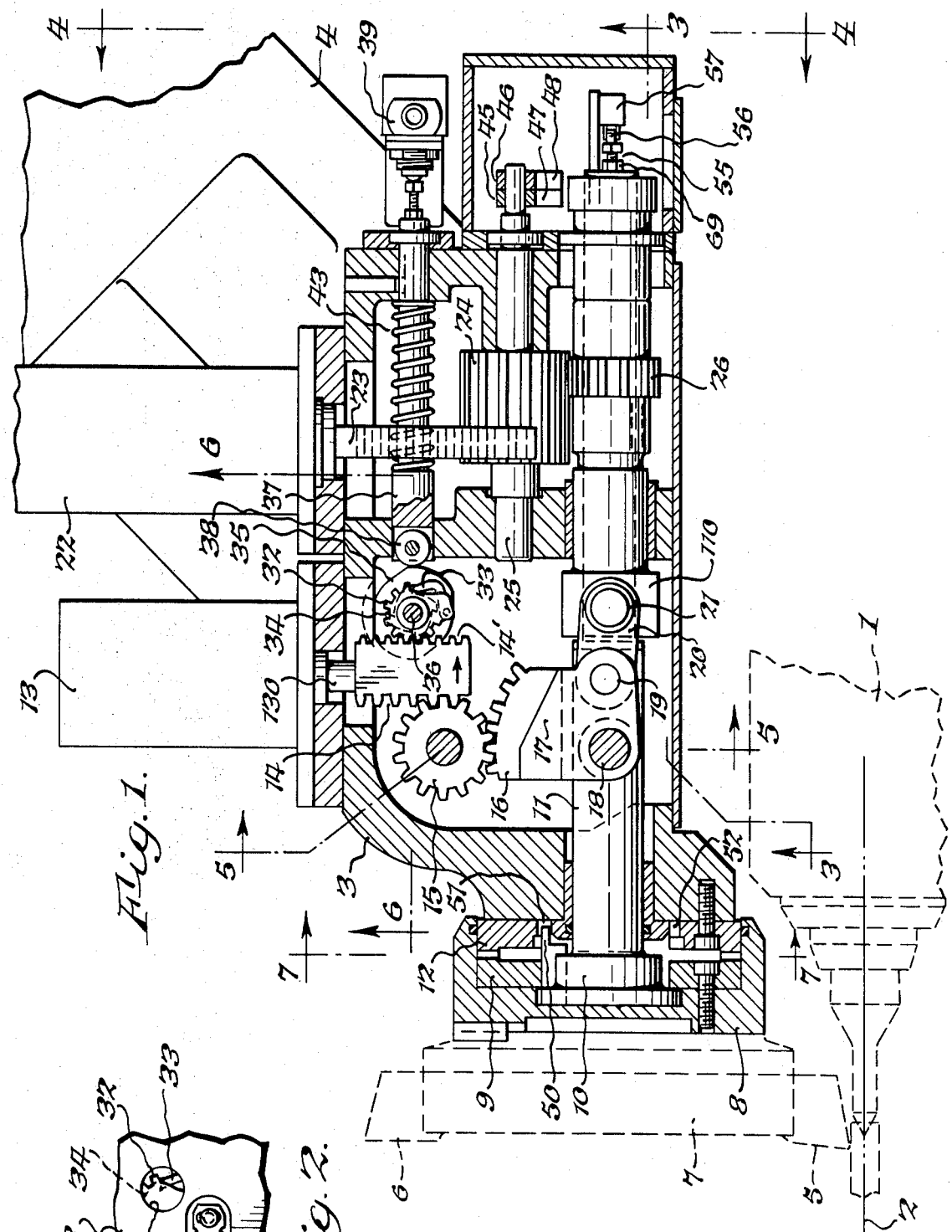
INVENTOR.
Constantine F. Cafolla
BY
Christel + Bean
ATTORNEYS.

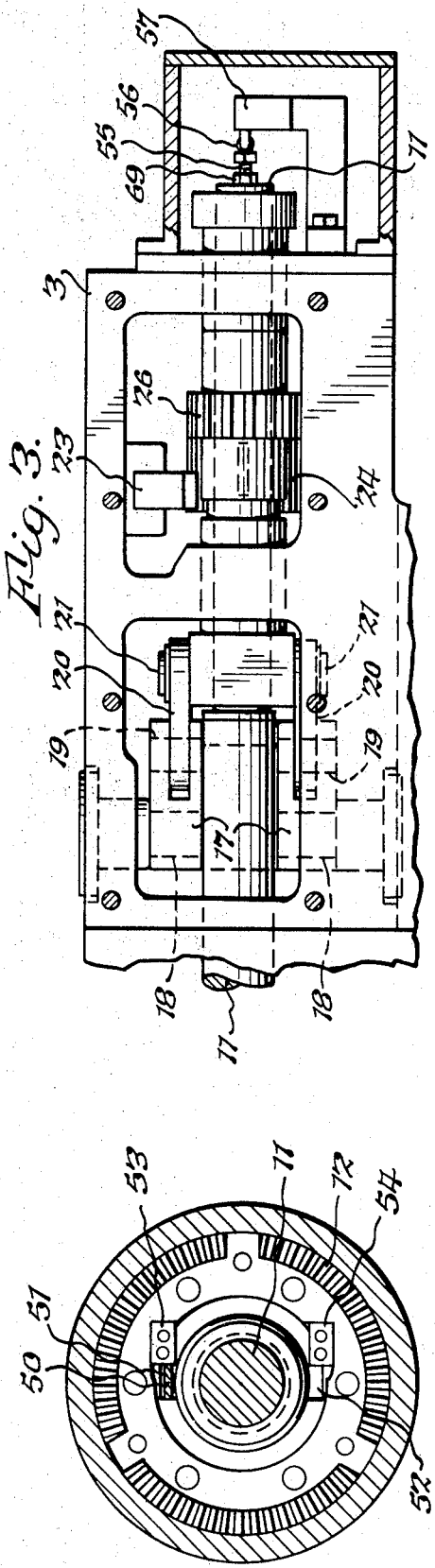
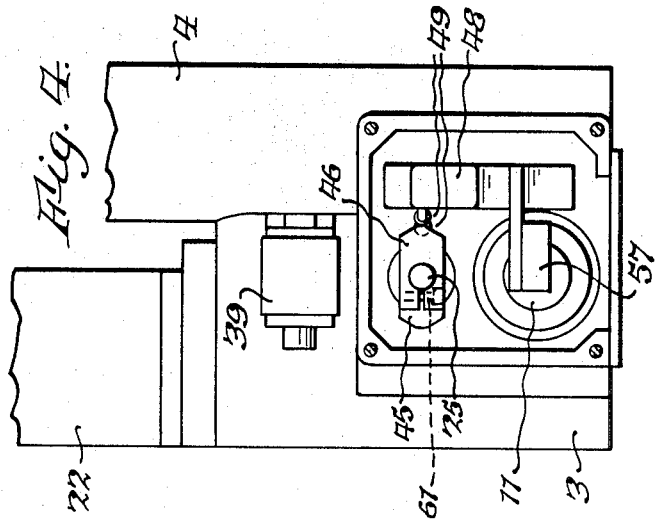
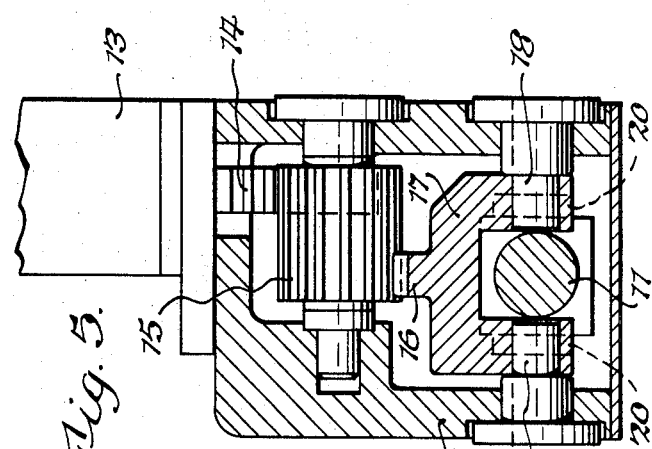
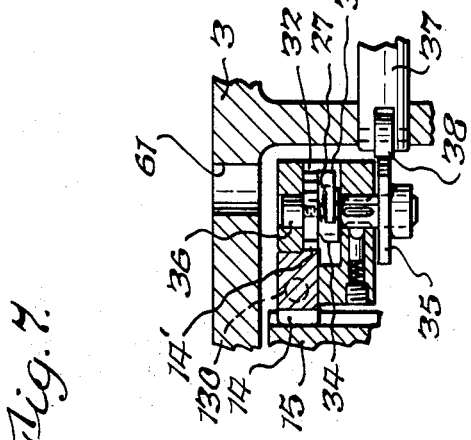

INVENTOR.
Constantine F. Cafolla
BY
Christel + Bean
ATTORNEYS.

United States Patent Office 3,572,194
Patented Mar. 23, 1971

3,572,194
AUTOMATIC INDEXING TOOL BLOCK
Constantine F. Cafolla, Waterloo, N.Y., assignor to Seneca Falls Machine Company, Seneca Falls, N.Y.
Filed Feb. 12, 1968, Ser. No. 704,878
Int. Cl. B23b 29/32
U.S. Cl. 82—36                                    8 Claims

ABSTRACT OF THE DISCLOSURE

A clamping and index shaft is mounted for rectilinear reciprocal movement between extended and retracted positions and also for rotary movement between index positions. A tool block is mounted on the shaft for movement therewith between index position, and a coupling member is mounted on the shaft for movement therewith into and out of retracted position. Another coupling member engages the one to hold the shaft against indexing when the shaft is retracted. A motor is operable to move the shaft between extended and retracted positions, and another motor is operable to rotate the shaft by the index positions. The one motor is arranged in controlling relation to the other for indexing the shaft only upon movement out of retracted position, thereby disengaging the coupling members.

BACKGROUND OF THE INVENTION

This invention relates to the tool indexing art, and more particularly to a new and useful automatic indexing tool block.

Indexing tool blocks, functioning to index selected tools into and out of working position, are well known and it also is well known to automatically index the proper tool into working position in accordance with a pre-arranged sequence of operation.

It is important that the tool block properly index, before resuming the machining function. If the selected tool is not properly located, a malfunction will result. Accordingly, it is customary to provide automatically indexing tool block assemblies with various safety arrangement to protect against such malfunction.

However, over the years such automatic indexing tool block arrangements have become increasingly complex. This poses a problem both in terms of original cost and the cost of servicing and maintaining any complex machine controls.

SUMMARY OF THE INVENTION

Accordingly, it is a primary object of my invention to provide an automatic indexing tool block assembly which is relatively simple and inexpensive in construction, while providing the safety features necessary to prevent malfunction.

Another object of my invention is to accomplish the foregoing in a tool block assembly which can be adjusted and serviced readily, on the job and without shutting down for extended periods of time.

Still another object of my invention is to provide the foregoing in an assembly which avoids complex electrical controls, and which can be serviced and adjusted by a typical machine operator.

The foregoing and other objects, advantages and characterizing features of my invention will become apparent from the ensuing detailed disclosure of an illustrative embodiment depicted in the accompanying drawings.

DESCRIPTION OF THE DRAWING FIGURES

FIG. 1 is a view partly in section and partly in elevation, showing an automatic indexing tool block assembly of my invention, parts being broken away for convenience in illustration, the tool block and the associated machine parts being shown in broken lines;

FIG. 2 is a fragmentary, detail view in elevation;

FIG. 3 is a fragmentary view taken about on line 3—3 of FIG. 1;

FIG. 4 is an end elevation taken about on line 4—4 of FIG. 1;

FIG. 5 is a view partly in section and partly in elevation, taken about on line 5—5 of FIG. 1;

FIG. 6 is a fragmentary sectional view taken about on line 6—6 of FIG. 1;

FIG. 7 is a sectional view taken about on line 7—7 of FIG. 1;

DETAILED DESCRIPTION OF THE PREFERRED EMBODIMENT

Figure 8:
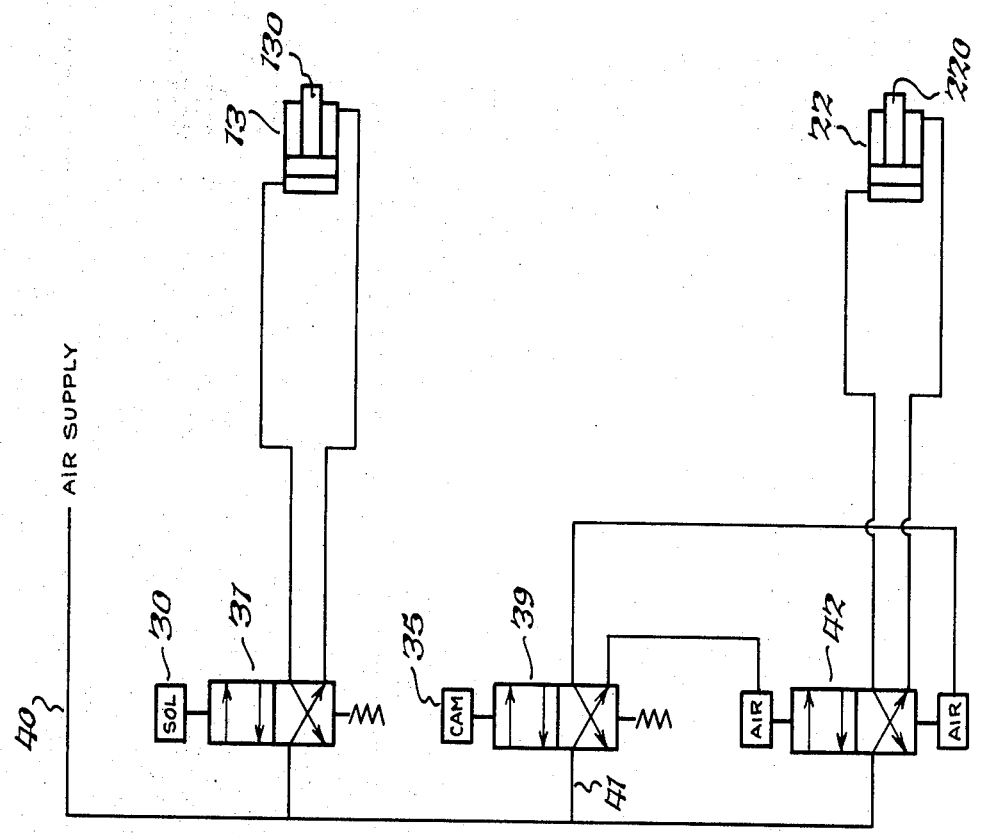
FIG. 8 is a generally schematic fluid control circuit diagram.
Figure 9:
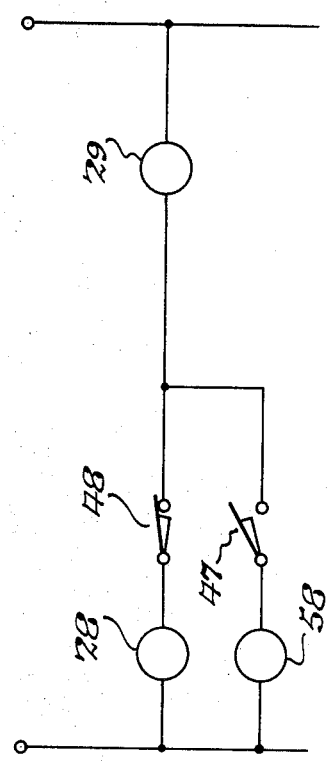
FIG. 9 is a generally schematic electrical control circuit diagram.

Referring now in detail to the illustrative embodiment of my invention depicted in the accompanying drawing, the same is shown in conjunction with a lathe having a tail stock 1 and a spindle axis 2. The tool block includes a housing 3 which is mounted on the tool slide 4 of a tracer unit.

Cutting tools 5 and 6 are secured in a typical manner to a tool block 7, it being understood that cutting tools 5 and 6 can be of any desired type. Tool block 7 is bolted to an adapter plate 8 which in turn is fixed to a movable outer index coupling member 9. Outer index coupling member 9 clamps plate 8 in fixed relation to the enlarged, shouldered end 10 of an elongated shaft 11 which is mounted in housing 3 for rectilinear reciprocal movement, horizontally as viewed in the drawing, between retracted and extended positions.

In the retracted position of shaft 11, outer index member 9 is engaged with a fixed index coupling member 12 which is bolted or otherwise secured in position on housing 3. Member 12 has teeth, serrations or the like on its working face, mating with a corresponding configuration on the abutting face of member 9 for locking the latter against rotation when shaft 11 is held in its retracted position.

Shaft 11 is extended and retracted by a clamping and release motor in the form of a pneumatic cylinder 13, the piston of which is connected via rod 130 to a rack 14 engaging an intermediate gear 15 which in turn engages a gear segment 16 mounted on a yoke 17. The latter is pivoted at 18 on housnig 3 and is pivotally connected at 19 to a pair of links 20 which are pivotally connected at 21 to a thrust bearing 110 for axially shifting shaft 11 journaled therein. It will be seen that extension of motor rack 14 will cause segment 16 to rotate counterclockwise, as viewed in the drawing, which in turn will slide shaft 11 in a direction extending the same. Coupling member 9 thereby is separated from fixed coupling member 12, and is free to rotate upon rotation of shaft 11, carrying tool block 7 with it.

Shaft 11 is rotated by an index motor in the form of a pneumatic cylinder 22 having its piston connected to a rack 23 which engages a pinion 24 mounted on a shaft 25. Another pinion 26 is fixed to shaft 11, and always is in engagement with pinion 24. Accordingly, extension of rack 23 rotates pinions 24 and 26, and through the latter rotates shaft 11 which carries with it end 10 and tool block adapter 8, indexing tool block 7 to alternate the positions of tools 5 and 6.

Turning now to the control diagram, assume that tool 5 is a rough tool and tool 6 is a finish tool. Closing a switch through an appropriate signal, by means schematically indicated at 28, actuates a control relay 29 which in turn energizes a solenoid 30 to shift valve 31 and thereby actuate motor 13. This extends rack 14, causing shaft 11 to be extended as previously described and uncoupling tool block 7 from fixed coupling 12. Extension of piston rod 130 also rotates a ratchet gear segment 32 which engages a rack 14' on the opposite side of piston rod 130 from rack 14. A ratchet finger 33 is pivotally mounted on ratchet gear segment 32, whereby rotary motion of the latter causes finger 33 to impart a 90° movement to a ratchet 34 against which it is yieldably urged by torsion spring 27. A cam 35, mounted for rotation on a shaft 36, is rotated by rotation of ratchet 34. Cam 35 has alternating high and low rises at 90° intervals, and imparts axial movement to a valve push rod 37 which carries a roller 38 engaging the surface of cam 35 in the manner of a follower. At its opposite end rod 37 engages a pilot valve 39 which controls the admission of air from a suitable air supply via conduits 40 and 41 to a control valve 42. The latter in turn controls the admission of air to opposite ends of indexing cylinder 22. Rod 37 is keyed against rotation.

Roller 38 of rod 37 is held against the surface of cam 35 by a spring 43, and cam 35 is arranged so that when the racks 14, 14' are extended to a position extending shaft 11 and uncoupling tool block 7, pilot valve 39 is actuated to cause cylinder 22 to extend its rack 23 and thereby rotate shaft 11. In other words, only upon uncoupling of tool block 7, whereby it is free to rotate, is motor 22 actuated to rotate shaft 11 and with it tool block 7 in a manner indexing tools 5 and 6.

Shaft 25 carries a pair of switch engaging dogs 45 and 46 rotating therewith and adapted to engage a pair of clamp cylinder control switches 47 and 48, respectively, each of which have rollers 49 adapted to be engaged by cam surfaces on the switch dogs, as shown upon completion of indexing. Switch 48 is closed and switch 47 opened when tool 5 is in working position, while switch 47 is closed and switch 48 opened when tool 6 is in cutting position, it being understood that this occurs at opposite ends of the stroke of cylinder 22. Assuming that tool 6 has just been indexed to cutting position, 47 is closed at the conclusion of indexing movement, control relay 29 causes motor 13 to reverse and retract its piston rod 130, thereby retracting shaft 11 and moving coupling members 9 and 12 into coupling engagement. However, a finger 50 fixed to the shouldered end 10 of shaft 11 for rotation therewith must engage in either recess 51 or recess 52 in member 12, denoting the two indexed positions of tool block 7. These positions also are defined by stops 53 and 54 mounted on fixed coupling member 12. If the finger 50 is not aligned with the appropriate recess 51 or 52, a complete indexing action did not occur, shaft 11 cannot be fully retracted and coupling members 9 and 12 will not engage. A dog 55 at the inner end of shaft 11 is adapted to engage the actuating roller 56 of a switch 57 only when shaft 11 is fully retracted. Switch 57 is an interlock arranged in controlling relation to the machine drive, whereby the machine will not feed until switch 57 is closed. This insures against operation of the machine with tool block 7 improperly indexed.

Return movement of motor 13 also returns gear segment 32 and ratchet finger 33 to their previous position, for again rotating ratchet 34 and cam 35 through ninety degrees.

Assuming that shaft 11 fully retracted, actuating switch 57, the machine will feed with tool 6 in cutting position. When it is time to index tool 5 back to cutting position, signal 58 is actuated by any suitable means, energizing relay 29 to shift valve 31 and again actuate motor 13 in a direction extending shaft 11. This time cam 35 is shifted to a "low," whereby valve 39 is deactivated. This shifts valve 42 to a position causing motor 22 to retract, rotation shaft 11 through an arc of 180°, in a direction opposite that of the immediately preceding indexing movement. Assuming that a complete indexing action takes place, as intended, switch 57 will close and the machine feed will start. Upon activating signal 28, the tool block will again index in the manner first described.

The energizing circuit for solenoid 30 can include a holding circuit for maintaining it energized until the indexng action is complete, whereupon solenoid 30 is de-energized and valve 31 spring returned to reverse the air supply to motor 13.

Closure of switch 47 or 48, as the case may be, can control de-energization of solenoid 30. Valve 39 is spring returned, upon de-activation as rod 37 is spring-urged against either of the lows on cam 35.

Thus, it is seen that my invention fully accomplishes its intended objects. A relatively simple and uncluttered arrangement provides all of the desired functions, including safety interlocks. A very simple, direct control arrangement, actuated only upon proper positioning of the parts, is provided. An aperture 68 in housing 3 permits sighting of shaft 130 in its extended position, as denoted by indicia 59 on the shaft and an index pointer 60 which can be factory adjusted, and is recessed in housing 3. Another sighting aperture 61 permits visual inspection of the ratchet position, whereby any necessary adjustments can be made readily, on the job. Dog 55 can be threaded into and out of shaft 11, and locked in adjusted position by lock nut 69. Dogs 45 and 46 can be rotated about the axis of shaft 25, and clamped in adjusted position by bolts 61.

While only one embodiment has been disclosed in detail, it will be appreciated that this has been done by way of illustration and that my invention is not necessarily limited thereto. Having fully disclosed and completely described my invention, what I claim as new is:

1. An automatic indexing tool block assembly comprising a housing, clamping and index shaft means mounted in said housing for rectilinear reciprocal movement between extended and retracted positions and also for rotary movement between index positions, a tool block, means mounting said tool block on said shaft means for rotary movement therewith between said index positions, first coupling means mounted on said shaft means for movement therewith into and out of said retracted position, relatively fixed second coupling means engaging said first coupling means and holding said shaft means against rotary indexing movement when said shaft means is in said retracted position, first motor means operable to move said shaft means rectilinearly between extended and retracted positions, second motor means operable to rotate said shaft means between said index positions, means arranging said first motor means in controlling relation to said second motor means whereby the latter are actuated only upon movement of said shaft means out of said retracted position to thereby disengage said first and second coupling means, first means associated with one of said coupling means for preventing movement of said shaft means into said retracted position whenever said shaft means and said first coupling means are not in one of said index positions, and second means associated with the other of said coupling means for engaging with said first means only when said shaft means and said first coupling means are in one of said index positions thereby permitting movement of said shaft means into said retracted position.

2. An automatic indexing tool block as set forth in claim 1, together with control switch means actuated by said shaft means when the latter is in said retracted position.

3. An automatic indexing tool block as set forth in claim 1, wherein said first means comprises a locating finger associated with one of said coupling means and said second means comprises finger receiving recesses associated with the other of said coupling means, said finger being aligned with one of said recesses only when said shaft means and said first coupling means are in one of said index positions, said finger blocking said coupling members against coupling engagement and blocking said shaft means against movement into said retracted position whenever said shaft means and said first coupling means are not in one of said index positions.

4. An automatic indexing tool block as set forth in claim 1, together with an intermediate shaft, a pinion carried by said intermediate shaft, a rack reciprocated by said second motor for rotating said pinion and said intermediate shaft in opposite directions, and another pinion carried by said shaft means in sliding engagement with said first-mentioned pinion.

5. An automatic indexing tool block assembly comprising a housing, clamping and index shaft means mounted in said housing for rectilinear reciprocal movement between extended and retracted positions and also for rotary movement between index positions, a tool block, means mounting said tool block on said shaft means for rotary movement therewith between said index positions, first coupling means mounted on said shaft means for movement therewith into and out of said retracted position, relatively fixed second coupling means engaging said first coupling means and holding said shaft means against rotary indexing movement when said shaft means is in said retracted position, first motor means operable to move said shaft means rectilinearly between extended and retraced positions, second motor means operable to rotate said shaft means between said index positions, means arranging said first motor means in controlling relation to said second motor means whereby the latter are actuated only upon movement of said shaft means out of said retracted position to thereby disengage said first and second coupling means, an energizing circuit for said second motor including a pilot valve, said arranging means comprising pilot valve control means including a cam and ratchet means for stepping said cam to alternate the position of said valve, said first motor being arranged to move said shaft means from said retracted position to said extended position and from said extended position to said retracted position once during each cycle of operation of said first motor, and means connecting said ratchet means to said first motor for stepping said cam once in each cycle of operation of said first motor.

6. An automatic indexing tool block assembly comprising a housing, clamping and index shaft means mounted in said housing for rectilinear reciprocal movement between extended and retracted positions and also for rotary movement between index positions, a tool block, means mounting said tool block on said shaft means for rotary movement therewith between said index positions, first coupling means mounted on said shaft means for movement therewith into and out of said retracted position, relatively fixed second coupling means engaging said first coupling means and holding said shaft means against rotary indexing movement when said shaft means is in said retracted position, first motor means operable to move said shaft means rectilinearly between extended and retracted positions, second motor means operable to rotate said shaft means between said index positions, means arranging said first motor means in controlling relation to said second motor means whereby the latter are actuated only upon movement of said shaft means out of said retracted position to thereby disengage said first and second coupling means, a gear segment pivotally supported in said housing, pivoted link means connecting said segment to said shaft means for translating rotation of said segment into rectilinear movement of said shaft means, and means including a rack reciprocated by said first motor for rotating said gear segment in opposite directions.

7. An automatic indexing tool block assembly comprising a housing, clamping and index shaft means mounted in said housing for rectilinear reciprocal movement between extended and retracted positions and also for rotary movement between index positions, a tool block, means mounting said tool block on said shaft means for rotary movement therewith between said index positions, first coupling means mounted on said shaft means for movement therewith into and out of said retracted position, relatively fixed second coupling means engaging said first coupling means and holding said shaft means against rotary indexing movement when said shaft means is in said retracted position, first motor means operable to move said shaft means rectilinearly between extended and retracted positions, second motor means operable to rotate said shaft means between said index positions, means arranging said first motor means in controlling relation to said second motor means whereby the latter are actuated only upon movement of said shaft means out of said retracted position to thereby disengage said first and second coupling means, an intermediate shaft, a pinion carried by said intermediate shaft, a rack reciprocated by said second motor for rotating said pinion and said intermediate shaft in opposite directions, another pinion carried by said shaft means in sliding engagement with said first-mentioned pinion, switch means and means associated with said intemediate shaft for actuating said switch means upon predetermined rotation of said intermediate shaft in each direction.

8. An automatic indexing tool block assembly comprising a housing, clamping and index shaft means mounted in said housing for rectilinear reciprocal movement between extended and retracted positions and also for rotary movement between index positions, a tool block, means mounting said tool block on said shaft means for rotary movement therewith between said index positions, first coupling means mounted on said shaft means for movement therewith into and out of said retracted position, relatively fixed second coupling means engaging said first coupling means and holding said shaft means against rotary indexing movement when said shaft means is in said retracted position, first motor means operable to move said shaft means rectilinearly between extended and retracted positions, second motor means operable to rotate said shaft means between said index positions, means arranging said first motor means in controlling relation to said second motor means whereby the latter are actuated only upon movement of said shaft means out of said retracted position to thereby disengage said first and second coupling means, said second motor means being controlled by means including a control valve, a rotary cam, a valve actuating member spring-urged against said cam, and means for rotating said cam including a ratchet, a ratchet finger spring-urged into engagement with said ratchet, a gear segment connected to said finger for rotating the same in opposite directions, and means including a rack reciprocated by said first motor for rotating said gear segment in opposite directions.

References Cited
UNITED STATES PATENTS

| | | | |
|---|---|---|---|
| 2,941,424 | 6/1960 | Dixon | 74—814 |
| 2,952,169 | 9/1960 | Johnson | 82—36 |
| 2,979,971 | 4/1961 | Darash | 74—826X |
| 3,035,461 | 5/1962 | Benjamin et al. | 74—813 |
| 3,111,044 | 11/1963 | Diener et al. | 74—826 |
| 3,099,873 | 8/1963 | Brainard et al. | 77—64X |

LEONIDAS VLACHOS, Primary Examiner

U.S. Cl. X.R.

74—826